US009690047B2

(12) United States Patent
Zhao

(10) Patent No.: US 9,690,047 B2
(45) Date of Patent: Jun. 27, 2017

(54) HOT MELT CONNECTOR STRIPPING CUTTER TOOL

(71) Applicants: INNO INSTRUMENT (CHINA) .INC, Weihai (CN); INNO INSTRUMENT, INC., Incheon (KR)

(72) Inventor: Yangri Zhao, Weihai (CN)

(73) Assignees: INNO INSTRUMENT (CHINA), INC., Weihai (CN); INNO INSTRUMENT, INC., Incheon (KR)

( * ) Notice: Subject to any disclaimer, the term of this patent is extended or adjusted under 35 U.S.C. 154(b) by 266 days.

(21) Appl. No.: 14/418,556

(22) PCT Filed: Sep. 25, 2012

(86) PCT No.: PCT/CN2012/081905
§ 371 (c)(1),
(2) Date: Jan. 30, 2015

(87) PCT Pub. No.: WO2014/019280
PCT Pub. Date: Feb. 6, 2014

(65) Prior Publication Data
US 2015/0226919 A1 Aug. 13, 2015

(30) Foreign Application Priority Data

Aug. 3, 2012 (CN) .......................... 2012 1 0274456
Aug. 3, 2012 (CN) .......................... 2012 2 0382562

(51) Int. Cl.
G02B 6/245 (2006.01)
(52) U.S. Cl.
CPC ................... *G02B 6/245* (2013.01)
(58) Field of Classification Search
CPC ........ G02B 6/245; G02B 6/46; H02G 1/1204; H02G 1/1214
See application file for complete search history.

(56) References Cited

U.S. PATENT DOCUMENTS 4,271,729 A * 6/1981 Perrino ................ H02G 1/1214
  30/90.1
4,315,444 A * 2/1982 Perrino ................ H02G 1/1214
  264/157

(Continued)

FOREIGN PATENT DOCUMENTS

CN 201266262 Y 7/2009
CN 201682223 U 12/2010
(Continued)

*Primary Examiner* — David B Thomas
(74) *Attorney, Agent, or Firm* — Anova Law Group, PLLC

(57) ABSTRACT

A hot melt connector stripping cutter tool comprises a first handle, a second handle, a reference block and a cutting mechanism. The cutting mechanism comprises at least one group of upper and lower blade seats and a stripping cutter unit. The reference block is provided with an optical fiber guiding passage for an optical fiber to pass through and at least two blade guiding grooves both communicated with the optical fiber guiding passage. At least two groups of stripping cutter units used for scattering optical fiber stress points are symmetrically arranged on the upper and lower blade seats. Each group of stripping cutter units is movable within one blade guiding groove. Along with the closing of the handles, each stripping cutter unit moves up and down along the blade guiding groove in the cutting direction, so as to cut an outer skin or part thickness of the optical fiber in the optical fiber guiding passage, and peel off a surface skin and a bare fiber coating layer of the optical fiber. A plurality of incisions can be cut out on the surface skin of the optical fiber in the optical fiber guiding passage by the plurality of stripping cutter units, the optical fiber stress positions are scattered, and the optical fiber is not easy to be pulled apart while being peeled.

13 Claims, 5 Drawing Sheets

(56) References Cited

U.S. PATENT DOCUMENTS

| | | | | |
|---|---|---|---|---|
| 4,625,386 A * | 12/1986 | Bieganski | .......... | H01R 43/0421 29/33 M |
| 4,850,108 A * | 7/1989 | Perrino | ................ | G02B 6/245 219/227 |
| 6,230,387 B1 * | 5/2001 | Gritters | ................ | B25B 27/146 29/566.4 |
| 8,676,018 B2 * | 3/2014 | Barnes | .................. | G02B 6/245 30/90.1 |
| 9,075,196 B2 * | 7/2015 | Homma | ................ | G02B 6/245 81/9.41 |
| 2010/0187276 A1 * | 7/2010 | Ohmura | .................. | G02B 6/25 225/2 |
| 2014/0338195 A1 * | 11/2014 | Zhao | ...................... | B26B 27/00 30/90.1 |

FOREIGN PATENT DOCUMENTS

| | | |
|---|---|---|
| CN | 201812078 U | 4/2011 |
| JP | 3243024 A | 10/2001 |
| JP | 2005215662 A | 8/2005 |
| JP | 2008167813 A | 7/2008 |
| JP | 3175584 U | 4/2012 |

\* cited by examiner

HOT MELT CONNECTOR STRIPPING CUTTER TOOL

TECHNICAL FIELD

The invention relates to a stripping cutter tool for peeling off an out skin and an optical fiber coating layer of an optical fiber cable, particularly a hot melt connector stripping cutter tool for removing optical fiber surface skin and an inner bare fiber coating layer at the end terminal of a hot melt connector.

BACKGROUND ART

With the advances in communication technology, the transmission speed and quality of information have become increasingly demanding. Optical communication and its own advantages are increasingly widely applied, and thus optical fiber has also been considerablly used. further to say, it is an optical communication era.

Hot connector stripping cutting is mainly aimed to perform the operation of peeling off a surface skin from 900 um optical fiber at the end terminal of a hot melt connector. In terms of composition and structure, the 900 um optical fiber is formed by heat shrinking a layer of protective and intensity-improving plastic skin on the outer surface of a common bare optical fiber. Thus, if it is needed to construct and weld, we need to remove its outer skin firstly and then remove its inner bare optical fiber. However, as the plastic skin is heat shrinked thereon and it has a very high intensity, the optical fiber will be very easy to break if a common optical fiber stripping cutting is used to perform this construction, thereby causing the hot melt connector invalid and resulting in a great waste. Currently on the market there is another solution that uses a thermal stripping method to peel off from the 900 um optical fiber. This method has a high success rate, greatly reducing the waste of an ordinary stripping cutting. However, when using this stripping cutting at work, the 900 um optical fiber must be heated such that the 900 um optical fiber skin originally shrinked up becomes loose, and then is pulled out. Thus, when this stripping cutting is used at work, there must have a certain heating time, so it is impossible to achieve the effect of using while peeling, that is, it has low efficiency. In addition, its heating function also determines that its operation must be performed in an environment where there is electricity conducted.

That is to say, currently on the market, the fiber-stripping tool, i.e., stripping cutting (or stripping device), directed to a hot melt connector, has the following types:

1. Using heat-stripping manner, that is, firstly heating 900 um optical fiber to a certain temperature, and then stripping off the 900 um optical fiber skin, or striping off the 900 um optical fiber skin and its inner bare fiber coating layer one time. Use of this heat-stripping manner to strip the 900 um optical fiber has higher success rate, but the heaeting manner results in its low efficiency, because only when the optical fiber is heated to a certain temperature, can the optical fiber is stripped. In addition, the heating function also determines that its operation must be in an environment where there is electricity conducted, so it has defects of limited environment and inefficiency.

2. Using a common optical fiber stripping cutting manner. As common optical fiber stripping cutting is mainly designed for a bare fiber and is not highly adaptive to 900 um fiber, use of this manner to strip 900 um optical fiber may have the problem of being easy to break and causes a big waste. In addition, in this manner, the optical fiber needs to be repeatedly stripped to achieve the welding requirements, so the work efficiency is very low.

SUMMARY OF THE INVENTION

The purpose of the present invention is to provide a hot melt connector stripping cutter tool to solve the technical problem in the prior art that the heat-stripping manner has limitation in environment and has inefficiency and the common optical fiber stripping cutting manner has problem of being easy to break and causing waste and has low efficiency.

A hot melt connector stripping cutter tool, comprising a first handle, a second handle, a reference block and a cutting mechanism, wherein the first handle and the second handle are actively connected to the reference block; the cutting mechanism comprises at least one group of upper and lower blade seats and a stripping cutter unit, the upper blade seat and the lower blade seat are actively connected to the reference block via guiding means and movable up and down along the guiding means in the cutting direction; the reference block is provided with an optical fiber guiding passage for an optical fiber to pass through and at least two blade guiding grooves both communicated with the optical fiber guiding passage; at least two groups of stripping cutter units used for scattering optical fiber stress points are symmetrically arranged on the upper and lower blade seats; each group of stripping cutter units is movable within one blade guiding groove; along with the closing of the handles, each group of stripping cutter units is movable up and down along the blade guiding groove in the cutting direction, so as to cut an outer skin or part thickness of the optical fiber in the optical fiber guiding passage and peel off a surface skin and a bare fiber coating layer of the optical fiber.

Preferably, the upper blade seat and the lower blade seat are respectively provided with at least two blade holes; each hole is provided with a stripping cutter unit therein; the stripping cutter unit is fixed into the blade hole via a blade-fixing shaft; the number and position of the blade hole match the number and position of the blade guiding groove.

Preferably, the upper blade seat and the lower blade seat are actively connected to the first and second handles respectively via a cutter seat shaft; the blade hole is located at both sides of the cutter seat shaft.

Preferably, the upper and lower blade seats are provided with a plurality of groups of stripping cutter units; each group of stripping cutter units corresponds to a cutting stroke; and the groups of stripping cutter units can chronologically move up and down and batch by batch along the respective blade guiding groove in the cutting direction.

Preferably, there are at least two groups of the upper and lower blade seats; each group of blade seats may be provided with at least two groups of stripping cutter units; the stripping cutter units of each group of blade seats correspond to a cutting stroke; and the stripping cutter units of the groups of blade seats can chronologically move up and down and batch by batch along the respective blade guiding groove in the cutting direction.

Preferably, in the state where the upper stripping cutter and the lower stripping cutter of each group of stripping cutter units are clamped closely, the upper stripping cutter and the lower stripping cutter are staggered and in a shape of scissors. The upper stripping cutter and the lower stripping cutter each are provided with a "V" shaped groove thereon, and the bottom of the "V" shaped groove is provided with a fiber-through groove.

The tool also comprises a handle open limiting mechanism comprising a limiting groove and a limiting pin; the limiting groove is disposed on the reference block; one end of the limiting pin is fixed to the handle and the other end is inserted into the limiting groove.

The tool further comprises stroke adjusting means for adjusting the cutting stroke of the stripping cutter unit, the stroke adjusting means being connected to the reference block. The stroke adjusting means comprises at least a top block pin and a corresponding adjusting screw; the top block pin is disposed on the reference block; the first handle and/or the second handle are provided with a corresponding adjusting screw on the top of the top block pin at the corresponding side.

The optical fiber guiding passage utilizes a V-shaped groove for facilitating guidance of an optical fiber.

Additionally, the front end portion of the optical fiber guiding passage is provided with a positioning mechanism for positioning the body and the front end of the hot melt connector; and the shape of the front end portion of the optical fiber guiding passage is adaptive to the shape of the body and the front end of the hot melt connector.

In the present invention, the upper blade seat and the lower blade seat each is provided with at least two blade holes; the upper stripping cutter of the upper blade seat and the lower stripping cutter of the lower blade seat at least constitute two groups of stripping cutters; the upper and lower stripping cutters are disposed inn a cutting shape; after closing the handles and cutting with the stripping cutter, a plurality of incisions can be cut out on a surface skin and a coating layer of the optical fiber to scatter the optical fiber stress positions, thus the optical fiber is not easy to be pulled apart while being peeled.

The present invention is also provided with stroke adjusting means and a handle open limiting mechanism, which can change the angle between the handles while being closed and the reference block, so as to change the cutting stroke of the stripping cutter. In addition, an adjusting screw is used to adjust the stroke of the handles such that the stripping cutter will not hurt the optical fiber while peeling the optical fiber. By moving the limiting pin within the limiting groove, the magnitude of the handle opening can be controlled and the handles can be prevented from being detached from the reference block.

A hot melt connector stripping cutter tool comprises a first handle, a second handle, a reference block and a cutting mechanism; the first handle and the second handle are actively connected to the reference block; the cutting mechanism comprises at least one group of upper and lower blade seats and a stripping cutter unit; the upper blade seat and the lower blade seat are actively connected to the reference block via guiding means and movable up and down along the guiding means in the cutting direction; the reference block is provided with an optical fiber guiding passage for an optical fiber to pass through and at least one blade guiding groove communicated with the optical fiber guiding passage; at least one group of stripping cutter units used for scattering optical fiber stress points is symmetrically arranged on the upper and lower blade seats; each group of stripping cutter units is movable within one blade guiding groove; along with the closing of the handles, each group of stripping cutter units is movable up and down along the blade guiding groove in the cutting direction, so as to cut an outer skin or part thickness of the optical fiber within the optical fiber guiding passage and peel off a surface skin and a bare fiber coating layer of the optical fiber; in addition, when two or more groups of upper and lower blade seats are used, each group of blade seats can be provided with at least one blade guiding groove; and when one group of upper and lower blade seats is used, each group of blade seats can be provided with two blade guiding grooves

DETAILED DESCRIPTION OF EMBODIMENTS

The present invention will be further described with reference of drawings.

Embodiment

Figure 1:
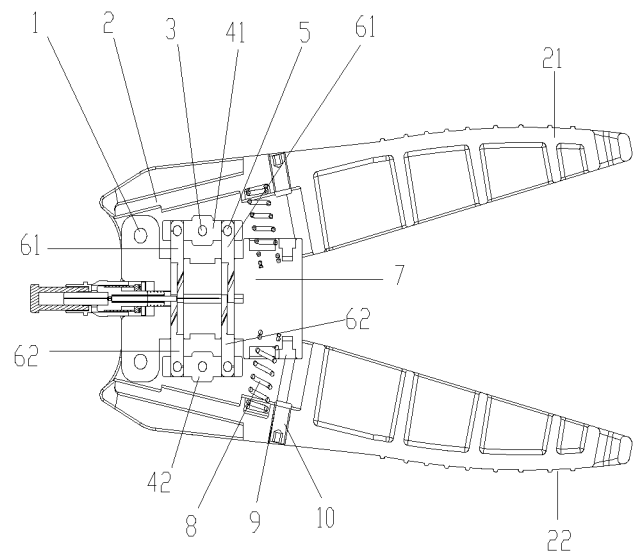
FIG. 1 is a schematic view of the state of a hot melt connector stripping cutter tool in use of the present invention.
Figure 2:
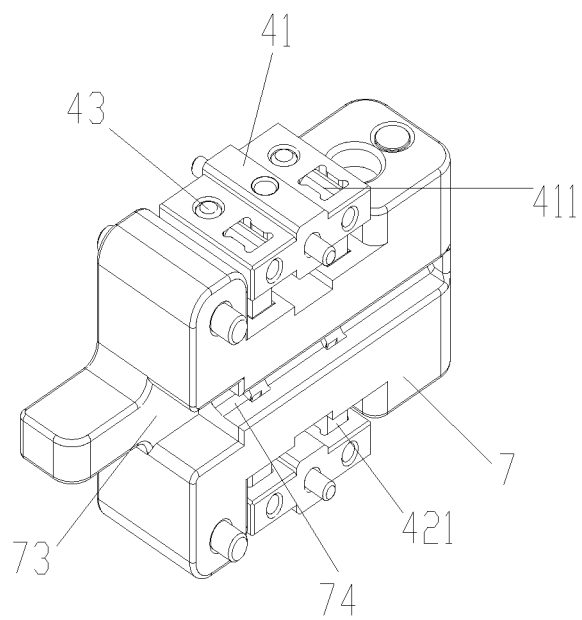
FIG. 2 is a schematic view of a reference block and blade seats of the present invention.
Figure 3:
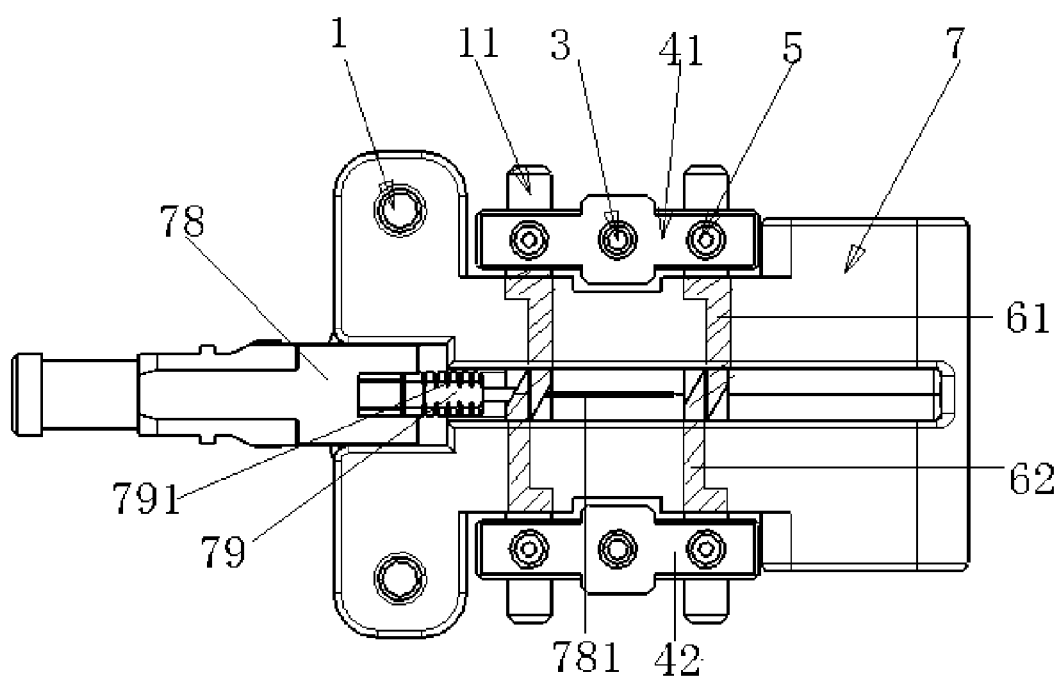
FIG. 3 is a perspective view of a reference block and blade seats of the present invention.
Figure 4:
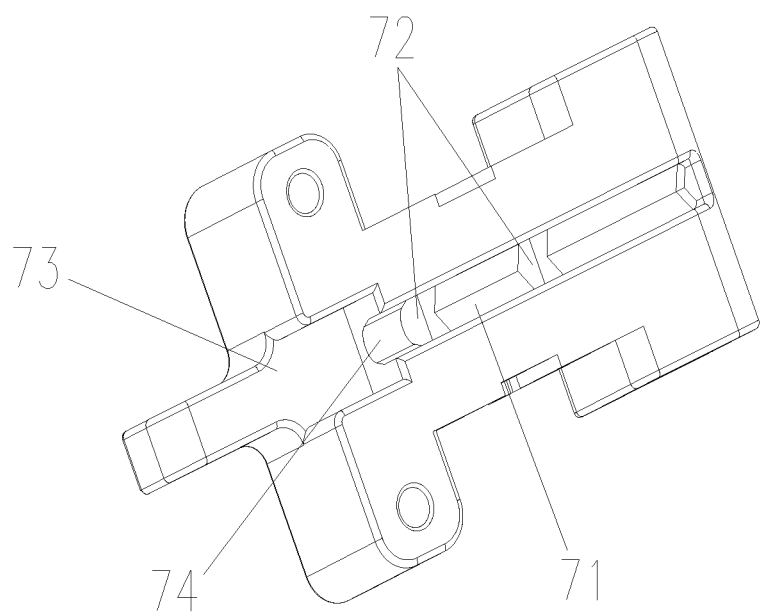
FIG. 4 is another schematic view of a reference block of the present invention.
Figure 5:
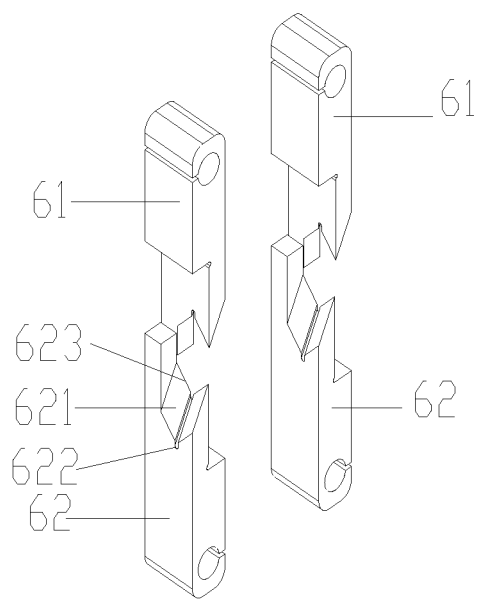
FIG. 5 is a schematic view of the stripping cutter of a hot melt connector stripping cutter tool of the present invention.
Figure 6:
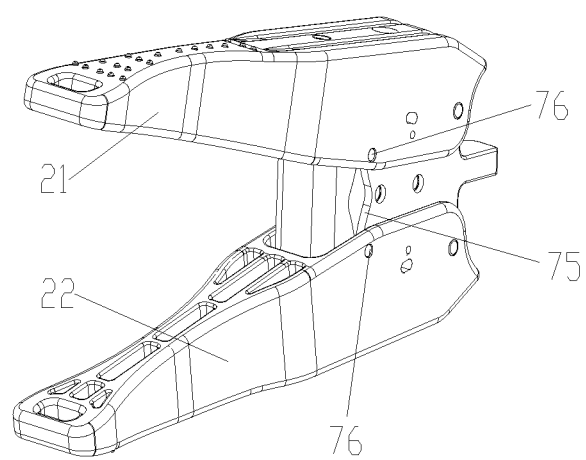
FIG. 6 is a rear view of a hot melt connector stripping cutter tool in use of the present invention.

Referring to FIGS. 1 to 6, a hot melt connector stripping cutter comprises a first handle 21, a second handle 22, a reference block 7 and a cutting mechanism; wherein the first handle 21 and the second handle 22 are actively connected to the reference block 7. In this embodiment, the first handle 21 and the second handle 22 are actively connected to the reference block 7 via a handle shaft 1, respectively, and a compression spring 8 may also be provided between the first handle 21 and the second handle 22 and the reference block 7.

The cutting mechanism comprises at least one group of upper and lower blade seats 41, 42 and a stripping cutter unit. The upper blade seat 41 and the lower blade seat 42 are actively connected to the first handle 21 and the second handle 22 respectively via a blade seat shaft 3. In this embodiment, the upper blade seat 41 is provided with at least two upper blade holes 411, correspondingly the lower blade seat 42 is provided with at least two lower blade holes 421, and an upper blade hole 411 and a corresponding lower blade hole 421 constitute a group of blade holes. Additionally, each group of blade holes is provided with a group of stripping cutter unit therein, each group of stripping cutter unit comprising an upper stripping cutter and a lower stripping cutter, that is, the upper blade hole 411 is provided with an upper stripping cutter 61 therein and the lower blade hole 421 is provided with a lower stripping cutter 62 therein; the upper stripping cutter 61 is fixed within the upper blade hole 411 via a blade fixing shaft 5, and the lower stripping cutter 62 is fixed within the lower blade hole 421 also via a blade fixing shaft 5.

The upper blade seat 41 and the lower blade seat 42 are actively connected to the reference block 7 via guiding means and movable up and down along the guiding means in the cutting direction. In this embodiment, the upper blade seat 41 and the lower blade seat 42 are both provided with a guide post hole 43, both sides of the reference block 7 are provided with a guide post 11, and the upper blade seat 41 and the lower blade seat 42 are respectively engaged within the guide post 11 at both sides via the guide post hole 43 to achieve the connection to the reference block 7. Such disposition of structure is not unique as it can be carried out by a variety of structures, and the above is only one example.

The reference block 7 is provided with an optical fiber guiding passage 71 for an optical fiber to pass through and at least two blade guiding grooves 72 both communicated with the optical fiber guiding passage 71. The optical fiber guiding passage 71 may be a "V"-shaped groove, a "U"-shaped groove, a square groove, or in any other shapes capable of guiding and placing a 900 um optical fiber. Preferably, "V"-shaped groove is used as it is beneficial for guiding an optical fiber. One blade guiding groove 72 is for a group of stripping cutter units to move up and down therein in the cutting direction.

Additionally, at least two groups of stripping cutter units for scattering optical fiber stress points are symmetrically arranged on the upper and lower blade seats 41, 42; along with the closing of the handles, each group of stripping cutter units is movable up and down within the blade guiding groove 72, so as to cut an outer skin or part thickness of the optical fiber in the optical fiber guiding passage and peel off a surface skin and a bare fiber coating layer of the optical fiber.

In this embodiment, in the state where the upper stripping cutter 61 and the lower stripping cutter 62 are clamped closely, the upper stripping cutter 61 and the lower stripping cutter 62 are staggered and in a shape of scissors. The lower stripping cutter 62 is provided with a "V" shaped groove 621 thereon, and the bottom of the "V" shaped groove 621 is provided with a fiber-through groove 622. Specifically, it can be carried out by the following technical means:

The upper stripping cutter 61 and the lower stripping cutter 62 each are provided with a sharp-cornered opening thereon; the bottom end face thereof is provided with a blade 623; the bottom of the opening thereof is provided along the movement direction of the optical fiber with a fiber-through groove that accommodates a fiber core for removing a bare fiber coating layer;

under the lamination state of the upper stripping cutter 61 and the lower stripping cutter 62, the upper stripping cutter 61 and the lower stripping cutter 62 cut an outer skin of the optical fiber and the fiber-through groove forms a passage through which the fiber core for removing a bare fiber coating layer pass intactly.

That is to say, the upper stripping cutter 61 and the lower stripping cutter 62 are inserted toward the upper and lower ends of the blade guiding groove, respectively and movable within the blade guiding groove; two blade guiding grooves correspond to the blade holes on the blade seats, respectively; and the upper blade hole 411, the blade guiding groove 72 and the lower blade hole 421 form a cutting channel.

A hot melt connector stripping cutter tool may further comprise stroke adjusting means connected to the reference block for adjusting the cutting stroke of the upper stripping cutter 61 and/or the lower stripping cutter 62. In this embodiment, the stroke adjusting means may comprise an adjusting screw 10 and a top block pin 9. There may be two top block pins 9 correspondingly mounted to the reference block 7. The first handle 21 and the second handle 22 are provided with a corresponding adjusting screw 10 on the top of the top block pin at the corresponding side. By means of the adjusting screw 10, the cutting stroke of the upper stripping cutter 61 and the lower stripping cutter 62 can be adjusted. Of course, there may also be only one top block pin 9 for adjusting the cutting stroke of the upper stripping cutter 61 only or of the lower stripping cutter 62 only. The stroke adjusting means can also be carried out using other existing means. It is not limited to the above as the above is illustrative only.

The upper and lower blade seats 41, 42 are provided with a plurality of groups of stripping cutter units that may move simultaneously or batch by batch. For example, each group of stripping cutter units corresponds to a cutting stroke, and the groups of stripping cutter units can chronologically move up and down and batch by batch along the respective blade guiding groove 72 in the cutting direction.

Of course, there may also be at least two groups of the upper and lower blade seats 41, 42. Each group of blade seats may be provided with at least one group of stripping cutter units. The stripping cutter units of each group of blade seats correspond to a cutting stroke. The stripping cutter units of the groups of blade seats can chronologically move up and down and batch by batch along the respective blade guiding groove in the cutting direction. For example, the idea of chronologically moving up and down and batch by batch may be: the group of stripping cutters at the farthest end to the optical fiber connector body does cutting movement first, and then the inward stripping cutter groups do cutting movement in order. When the outermost group of stripping cutters has cut and is pulled out, due to short distance of pulling, the optical fiber has a small stress and thus is not easy to break. When the closer group of stripping cutter strips, as the surface skin of the outside section has been peeled off, the distance they pull is also shorter, and the optical fiber also has a small stress and thus is not easy to break. That is to say, as each group of blades, after cutting, pull the optical fiber having surface skin in a shorter distance, the optical fiber has a small stress and thus the purpose of being not easy to break is achieved.

Further, if this solution is used, different groups of stripping cutters can be disposed on different blade seats but not necessarily located in the same blade seat. Of course, it can be carried out in many ways. As there are many solutions, they are not enumerated herein.

In this embodiment, the reference block 7 is also provided with a positioning mechanism for positioning the body and the front end of the hot melt connector; and the shape of the front end portion of the optical fiber guiding passage is adaptive to the shape of the body and the front end of the hot melt connector. The positioning mechanism comprises a body positioning mechanism 73 and a front end positioning groove 74. The body positioning mechanism 73 is for lifting up the rear portion of the body of the hot melt connector. The body positioning mechanism 73 is also provided with a notch therein adaptive to the protruding points at both sides of the front end of the hot melt connector. The front end positioning groove 74 is for fixing the front end of the hot melt connector.

The present invention further comprises a handle open limiting mechanism comprising a limiting groove 75 and two limiting pins 76. The limiting groove 75 is disposed on the reference block 7. The two limiting pins 76 are fixed to the first handle 21 and the second handle 22, respectively; and the other end of the limiting pin 76 is inserted into the limiting groove 75. When the first handle and the second handle are opening and closing, the limiting pins 76 move along the track of the limiting groove 75 such that the amplitude of opening of the two handles is limited and the two handles will not move away from the reference block 7.

APPLICATION EXAMPLE

In this embodiment, the upper blade seat 41 is provided with two upper blade holes 411, and the lower blade seat 42 is provided with two lower blade holes 421. The stripping cutters within the upper and lower blade holes are in a two-to-two corresponding manner to form two groups of stripping cutters disposed in a shape of scissors. The rear portion 78 of the body of the hot melt connector is fixed to the body positioning mechanism 73. The front end 79 of the hot melt connector is fixed to the front end positioning groove 74. The protruding points 791 at both sides of the front end of the hot melt connector are snapped into the notch. The optical fiber 781 is placed into the optical fiber guiding passage 71. While the first handle 21 and the second handle 22 are closing, the upper blade seat 41 and the lower blade seat 42 is closing to the reference block 7 along the guide post 11. While closing to the reference block 7 along the guide post 11, the upper blade seat 41 and the lower blade seat 42 drive the upper blade 61 and the lower blade 62 to cut to the direction of the optical fiber 781. When the upper blade seat 41 and the lower blade seat 42 are closed in place, the two groups of stripping cutters cut out two incisions on the surface skin and the coating layer of the optical fiber 781. By pulling the stripping cutters horizontally, the surface skin and the coating layer of the optical fiber is peeled off. When pulling, the optical fiber 781 has two stress positions so that the pulling force is scattered. Thus, the optical fiber is not easy to break. When the handles are released, under the restoring force of the compression spring 8, the first handle 21 and the second handle 22 are opened, and the limiting pin 76 moves within the limiting groove 75. The upper and lower handles stop opening when the limiting pin 76 moves to the end portion of the limiting groove 75. When the upper and lower handles are opened, the first handle 21 and the second handle 22 respectively drive the upper blade seat 41 and the lower blade seat 42 to move in the opposite direction of the reference block 7 along the guide post 11. In this case, the upper stripping cutter 61 and the lower stripping cutter 62 are opened. In addition, by turning the adjusting screw 10, the angle between the first handle and the second handle when closing and the reference block can be changed so as to change the cutting stroke of the blade and control the cutting depth such that the stripping cutter will not hurt the bare fiber while peeling off the surface skin and the coating layer of the optical fiber. Further, the number of the stripping cutter and the blade guiding groove can be increased as needed, which will not be defined herein.

The blade guide post may also be provided on the blade seat. A corresponding guiding hole may be disposed on the reference block. The blade seat can move up and down along the guiding hole via the blade guide post.

The foregoing disclosure is merely a specific embodiment of the present invention, which aims to describe the application of the present invention in a clearer manner but is not intended to limit the present invention. Any change conceivable by a person skilled in the art shall fall into the protection scope of the present invention.

The invention claimed is:

1. A hot melt connector stripping cutter tool, characterized in comprising a first handle, a second handle, a reference block and a cutting mechanism; wherein the first handle and the second handle are actively connected to the reference block; the cutting mechanism comprises at least one group of upper and lower blade seats and a stripping cutter unit; the upper blade seat and the lower blade seat are actively connected to the reference block via guiding means and movable up and down along the guiding means in the cutting direction; the reference block is provided with an optical fiber guiding passage for an optical fiber to pass through and at least two blade guiding grooves both communicated with the optical fiber guiding passage; at least two groups of stripping cutter units used for scattering optical fiber stress points are symmetrically arranged on the upper and lower blade seats; each group of stripping cutter units is movable within one blade guiding groove; along with the closing of the handles, each group of stripping cutter units is movable up and down along the blade guiding groove in the cutting direction, so as to cut an outer skin or part thickness of the optical fiber in the optical fiber guiding passage and peel off a surface skin and a bare fiber coating layer of the optical fiber.

2. The hot melt connector stripping cutter tool according to claim 1, characterized in that the upper blade seat and the lower blade seat are respectively provided with at least two blade holes; each hole is provided with a stripping cutter unit therein; the stripping cutter unit is fixed into the blade hole via a blade-fixing shaft; and the number and position of the blade hole match the number and position of the blade guiding groove.

3. The hot melt connector stripping cutter tool according to claim 2, characterized in that the upper blade seat and the lower blade seat are actively connected to the first and second handles respectively via a cutter seat shaft; and the blade hole is located at both sides of the cutter seat shaft.

4. The hot melt connector stripping cutter tool according to claim 1, characterized in that the upper and lower blade seats are provided with a plurality of groups of stripping cutter units; each group of stripping cutter units corresponds to a cutting stroke; and the groups of stripping cutter units can chronologically move up and down and batch by batch along the respective blade guiding groove in the cutting direction.

5. The hot melt connector stripping cutter tool according to claim 1, characterized in that there are at least two groups of the upper and lower blade seats; each group of blade seats may be provided with at least one group of stripping cutter units; the stripping cutter units of each group of blade seats correspond to a cutting stroke; and the stripping cutter units of the groups of blade seats can chronologically move up and down and batch by batch along the respective blade guiding groove in the cutting direction.

6. The hot melt connector stripping cutter tool according to claim 1, characterized in that in the state where the upper stripping cutter and the lower stripping cutter of each group of stripping cutter units are clamped closely, the upper stripping cutter and the lower stripping cutter are staggered and in a shape of scissors.

7. The hot melt connector stripping cutter tool according to claim 1, characterized in that the upper stripping cutter and the lower stripping cutter each are provided with a "V" shaped groove thereon, and the bottom of the "V" shaped groove is provided with a fiber-through groove.

8. The hot melt connector stripping cutter tool according to claim 1, characterized in further comprising a handle open limiting mechanism comprising a limiting groove and a limiting pin, the limiting groove being disposed on the reference block, one end of the limiting pin being fixed to the handle and the other end being inserted into the limiting groove.

9. The hot melt connector stripping cutter tool according to claim 1, characterized in further comprising stroke adjusting means for adjusting the cutting stroke of the stripping cutter unit, the stroke adjusting means being connected to the reference block.

10. The hot melt connector stripping cutter tool according to claim 1, characterized in that the stroke adjusting means comprises at least a top block pin and a corresponding adjusting screw, the top block pin being disposed on the reference block, the first handle and/or the second handle being provided with a corresponding adjusting screw on the top of the top block pin at the corresponding side.

11. The hot melt connector stripping cutter tool according to claim 1, characterized in that the optical fiber guiding passage utilizes a V-shaped groove for facilitating guidance of the optical fiber.

12. The hot melt connector stripping cutter tool according to claim 1, characterized in that the front end portion of the optical fiber guiding passage is provided with a positioning mechanism for positioning the body and the front end of the hot melt connector; and the shape of the front end portion of the optical fiber guiding passage is adaptive to the shape of the body and the front end of the hot melt connector.

13. A hot melt connector stripping cutter tool, characterized in comprising a first handle, a second handle, a reference block and a cutting mechanism; wherein the first handle and the second handle are actively connected to the reference block; the cutting mechanism comprises at least one group of upper and lower blade seats and a stripping cutter unit; the upper blade seat and the lower blade seat are actively connected to the reference block via guiding means and movable up and down along the guiding means in the cutting direction; the reference block is provided with an optical fiber guiding passage for an optical fiber to pass through and at least one blade guiding groove communicated with the optical fiber guiding passage; at least one group of stripping cutter units used for scattering optical fiber stress points is symmetrically arranged on the upper and lower blade seats; each group of stripping cutter units is movable within one blade guiding groove; along with the closing of the handles, each group of stripping cutter units is movable up and down along the blade guiding groove in the cutting direction, so as to cut an outer skin or part thickness of the optical fiber in the optical fiber guiding passage and peel off a surface skin and a bare fiber coating layer of the optical fiber; when two or more groups of upper and lower blade seats are used, each group of blade seats may be provided with at least one blade guiding groove; and when one group of upper and lower blade seats is used, each group of blade seats may be provided with two blade guiding grooves.

* * * * *